UNITED STATES PATENT OFFICE.

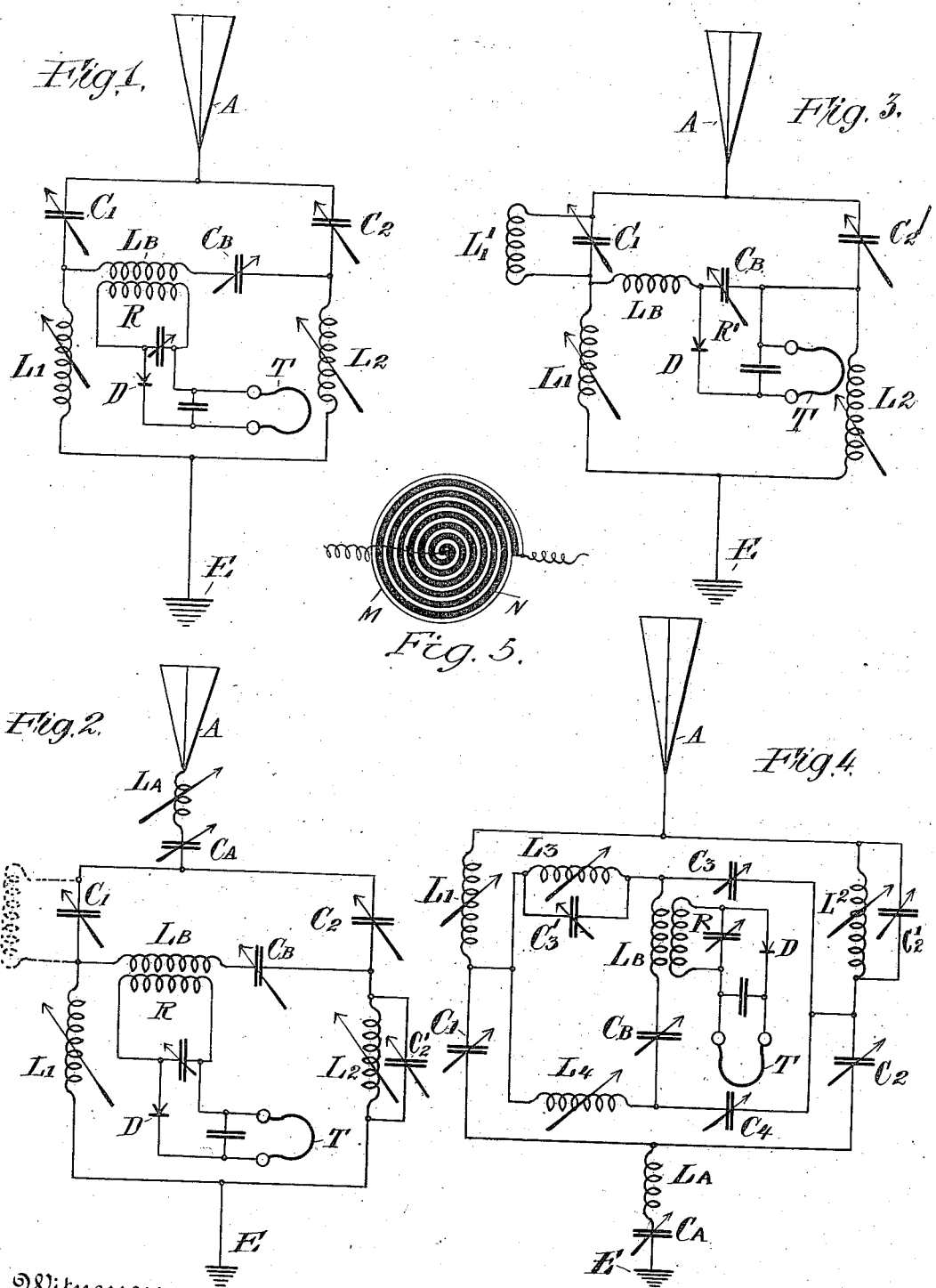

LEE DE FOREST, OF NEW YORK, N. Y., ASSIGNOR, BY MESNE ASSIGNMENTS, TO RADIO TELEPHONE & TELEGRAPH COMPANY, A CORPORATION OF DELAWARE.

RECEIVING SYSTEM FOR ELECTROMAGNETIC RADIATIONS.

1,134,593.    Specification of Letters Patent.    Patented Apr. 6, 1915.

Application filed May 5, 1910. Serial No. 559,525.

*To all whom it may concern:*

Be it known that I, LEE DE FOREST, a citizen of the United States, residing in the city, county, and State of New York, have made a certain new and useful Invention in Receiving Systems for Electromagnetic Radiations, of which the following is a specification.

This invention relates to receiving systems for electro-magnetic radiations.

The object of the invention is to provide a receiving system for electro-magnetic radiations in the transmission of wireless communications which eliminates the troubles and annoyances arising from interference or similar disturbances.

Other objects of the invention will appear more fully hereinafter.

The invention consists substantially in the construction, combination, location and relations of elements, all as will be more fully hereinafter set forth, as shown in the accompanying drawings, and finally pointed out in the appended claims.

Loose coupling methods as commonly employed in wireless receiving systems to prevent interference troubles, depend upon the principle of varying the mutual inductance between the antenna and receiving circuits to such an extent that the receiving circuit will not be acted upon by the oscillations set up in the antenna circuit by the received radiations, unless the two circuits are very exactly in resonance. In practice, however it is always found that very strong interfering oscillations or radiations can excite disturbing vibratory oscillations in the tuned secondary or receiving circuit of coupled systems, even if the natural frequency of said circuit is entirely different from that of the interfering radiations unless the mutual inductance of the antenna and receiving circuits is made so small that the radiations which it is desired to receive and detect are no longer able to appreciably excite the tuned secondary or receiving circuit.

It is among the special objects and purposes of my present invention to provide a receiving system which is not dependent upon variations in the mutual inductance of the antenna and receiving circuits, but which, on the contrary, provides for balancing out the interfering radiations, or the oscillations due to the same, and completely preventing the same from affecting the circuit of the receiving instrument.

In accordance with my invention I employ a bridge circuit arrangement at the receiving station and which is associated in the receiving antenna system, and I associate the receiver telephone and detector with the said bridging circuit. In carrying out my invention I so construct or arrange one of the legs of the bridge arrangement that its reactance to a received wave train varies greatly with the frequency of the received wave train.

Many different constructions and arrangements of the bridge system may well serve the purposes of my present invention. One form which I have found efficient, reliable and satisfactory for the purpose is to arrange a capacity and an inductance in shunt to each other in one of the legs of the bridge circuit. Another form is to employ an inductance coil in one of the legs of the bridge circuit composed of a flat ribbon conductor with the coils thereof wound in close relation to each other so as to give the greatest possible distribution of capacity. Still another form is to construct the condenser in a similar manner, that is with thin strips of flat material with an interposed ribbon dielectric, the flat strips being wound upon themselves to produce as great a self inductance as possible. In all these cases the object is to secure the combined qualities of great inductance and capacity, and other arrangements may serve to accomplish the same results. My broad invention in this respect, therefore, as defined in the claims, is not to be limited or restricted to any specific means for securing the characteristics mentioned.

In the drawings:—Figure 1 is a view in diagram showing one arrangement of bridge circuit arrangement for a receiving system embodying the principles of my invention wherein the circuit of the receiving device or telephone, and detector, is inductively associated with the bridging circuit. Fig. 2 is a similar view showing inductance and capacity arranged in shunt to each other in one of the legs of the bridge system. Fig. 3 is a similar view showing the circuit of the receiver device or telephone, and the detector, conductively connected to the bridge circuit. Fig. 4 is a similar view showing a compound bridge circuit arrangement embodying the principles of my invention. Fig. 5 is a plan view of the inductance I employ as one arrangement in carrying out my invention.

Referring to Fig. 1, A designates the antenna and E, the earth connection thereof, the bridge arrangement being interposed between the antenna and its earth connection. In one leg of the bridge circuit are connected the variable capacity C, and the adjustable inductance $L_1$, and in the other leg thereof are connected the variable capacity $C_2$ and the adjustable inductance $L_2$. In the bridging circuit is connected the inductance $L_B$ and $C_B$. The circuit R of the telephone receiver T, and detector D, is connected inductively to the bridging circuit. In this arrangement in accordance with the principles of my invention the inductance or the capacity in one leg or the other of the bridge arrangement should be so constructed and arranged as to secure the combined characteristics of great inductance and capacity. One means for securing this is by employing a specially constructed inductance as shown in Fig. 5, which consists of a flat ribbon conductor M wound in the form of a coil, and completely insulated by interposed insulation N.

Referring to the arrangement shown in Fig. 1, if we designate by $R_1$ the reactance (to an alternating current of a given frequency $n$) of the upper left hand branch of the bridge circuit; by $R_2$ that of the upper right hand branch; by $R_3$ that of the lower left hand branch; and by $R_4$ that of the lower right hand branch, then we know from the general theory of the Wheatstone bridge that when $\frac{R_1}{R_2} = \frac{R_3}{R_4}$ the bridge is balanced, that is, no current will flow through the bridging conductor $L_B$ $C_B$. But the reactance $R_1 = \frac{1}{C_1 w}$; reactance $R_2 = \frac{1}{C_2 w}$; reactance $R_3 = L_1 w$ and reactance $R_4 = L_2 w$. Where $n$, as above indicated, is the frequency, or number of cycles per second of the alternating electro-motive force impressed on the antenna earth circuit A—E, then $w = 2\pi n$. Substituting these values for $R_1$, $R_2$, $R_3$, $R_4$ in the reactance equation above given, and dividing out common elements the expression $\frac{C_1}{C_2} = \frac{L_2}{L_1}$ is obtained which equation represents the necessary condition for balancing such a bridge circuit as is illustrated in Fig. 1 as well as that illustrated in the other figures of the drawing provided always that in each case the reactance in each of the two upper branches of the bridge is a capacity reactance, and the reactance in each of the lower branches is an inductive reactance. Where it is desired simply to balance the bridge circuit against a given or definite frequency of received oscillations as for instance to prevent interference due to a nearby powerful transmitter, the arrangement shown in Fig. 1 is sufficient. This is therefore the simplest form of my invention. In this case a balance adjustment for each frequency would be necessary were it not for the fact that in accordance with my invention, as before explained, the inductances $L_1$ $L_2$ are so constructed that the reactances thereof vary with the frequency which is the case where the inductance is constructed of a very large conductor in which event its reactance increases rapidly with the frequency, so that while the bridge is balanced for a given frequency and for all frequencies below the given frequency it becomes more and more unbalanced as the frequency increases above the given frequency.

Now with the "branch circuit" arrangement shown in Figs. 2, 3 and 4, that is where inductances and capacities are arranged in shunt or series parallel to each other in one or another leg of the antenna earth bridge circuit, such "branch circuit", will have a capacity reactance, by suitable relative adjustment, for all frequencies above a certain given or critical frequency, and an inductive reactance for all frequencies below that critical frequency. This given or critical frequency is that which the circuit of $C_1$ $L^1_1$ when in series is in tune, that is the natural frequency of vibration of this circuit when closed and considered alone. In other words when the period of the impressed electromotive force is $$P = 2\pi \sqrt{L^1_1 C_1}$$

the reactance of this branch circuit becomes infinite. When this condition obtains of course no current will flow through that part or leg of the antenna earth bridge circuit which contains the "branch circuit" and consequently the bridge conductor with which the telephone receiver is associated becomes completely unbalanced. For this critical frequency, therefore, the maximum difference of potential will be impressed across the terminals of the bridge conductor, and if the natural period of this conductor be tuned to this critical frequency, the maximum effects will be produced in the receiver circuit associated therewith.

For frequencies of received currents which lie above the critical frequency, as above defined, the reactance of the leg of the antenna-earth bridge which contains the "branch circuit" is always a capacity reactance, and consequently by properly adjusting the capacity $C_2$ so that the relation $\frac{C_1}{C_2} = \frac{L_2}{L_1}$ holds the bridge conductor will be balanced and no current will flow therethrough, and this conductor continues more or less in balance for all such frequencies, even if the capacity $C_2$ be not especially altered or adjusted to secure a perfect balance. Similarly, as in the arrangement shown in Fig. 4, for example, if the impressed frequency lies below the "critical frequency," as above defined, of a branch circuit $L_2C^1_2$ the reactance of the leg containing this "branch circuit" becomes inductive, and, by suitable adjustment of $L_1$ $L_2$ or $C^1_2$ the relation $\frac{L_1}{L_2} = \frac{C_2}{C_1}$ may be established and consequently the bridge conductor may thus be balanced, either perfectly or imperfectly for any given frequency which lies below the "critical frequency." If the impressed frequency, however, be above this critical frequency, the reactance of the branch $L_2C^1_2$ becomes a capacity reactance, and consequently the outside bridge of Fig. 4 will be unbalanced for all such frequencies. As above shown the inner bridge can now be balanced (more or less perfectly) for all frequencies lying above the critical frequency so that the compound bridge system is thus adjustable to a high degree of selectivity, one bridge weeding out frequencies being below and the other bridge weeding out frequencies lying above the critical frequency.

From the foregoing it will be seen that by so constructing an inductance coil that it has a large distributed capacity, that is a strongly marked natural period of vibration of its own, the reactance thereof becomes infinite for that frequency to which it is itself in tune, and it becomes a capacity reactance for all frequencies above and an inductive reactance for all frequencies below that frequency. A bridge circuit therefore, which contains such a distributed capacity coil in one of its legs can be balanced for certain frequencies by a capacity in the conjugate leg, or for certain other (lower) frequencies by an inductance in the conjugate leg.

It will be noted that in securing the best results certain preliminary conditions should be observed. Thus it is important to tune the receiver circuit R, to the frequency of the wave trains to be received, and the entire antenna-earth bridge circuit should also be adjusted till the current generated therein from the radiations to be received is of maximum intensity in said bridging circuit. After observing these and other usual conditions, when it is desired to cut-out the interference due to a given frequency of radiations then the inductances and capacities in the legs of the bridge arrangement are adjusted until, with reference to the given frequency, they bear the proportional relation above referred to, thereby causing a balance in the bridging circuit, and hence the receiver telephone, while responsive to currents traversing the bridging circuit due to radiated energy of some other frequency, does not respond to the given frequency. I have found, in practice, that by thus adjusting the bridge inductances and capacities to cut out interference from a given frequency of radiated wave trains, the same adjustment is also sufficiently effective in eliminating interference due to all radiated waves of lower frequencies.

It is obvious that the receiver circuit R, may be coupled up or associated with the bridging circuit in many different ways. In Figs. 1, 2 and 4, I have shown this circuit inductively associated with the bridging circuit. In Fig. 3, the receiver circuit $R^1$, is shown coupled up in series in the bridging circuit but in shunt with the capacity $C_B$, therein.

If desired the entire antenna-earth system, including the bridge arrangement therein, may be tuned in the usual way, as for instance, by inserting a variable inductance $L_A$, and a variable capacity $C_A$, therein. In this manner closer preliminary tuning can be effected in order to cut out a large part of the interference ordinarily encountered, leaving the bridge arrangement of my invention to eliminate any remaining interference.

In the arrangement illustrated in Fig. 4, as above indicated, I employ one bridge arrangement with the inductance $L_1$, and capacity $C_1$, in one leg, and the combined inductance $L_2$, and capacity $C^1_2$, and the capacity $C_2$, in series in the other leg, but I make the bridging circuit itself a bridge arrangement with the inductance L, and capacity $C_4$, in one leg thereof, and the combined inductance $L_3$, and capacity $C^1_3$, and the capacity $C_3$, in the other leg, the receiver circuit R being associated with bridging circuit of the secondary bridge arrangement.

As indicated in the drawings the relation with respect to each other of the inductance and capacity in any leg of the bridge may be changed without departure from the spirit and scope of my invention.

Similarly the capacity and inductance in the antenna-earth system may be varied as to location, that is these elements may be between the antenna and the bridge arrangement, or they may be between the bridge arrangement and the earth.

Other variations and interchange of elements will readily suggest themselves.

What I claim as new and useful and of my own invention, and desire to secure by Letters Patent is,—

1. In a receiving system for electro-magnetic radiations, an antenna system including branches in parallel each containing inductance and capacity, a bridging circuit between said branches and a receiver circuit associated with said bridging circuit.

2. In a receiving system for electro-magnetic radiations, an antenna system including branches in parallel, each containing inductance and capacity elements, one of said elements combining the characteristics of inductance and capacity, a bridging circuit for said branches, and a receiver circuit associated with said bridging circuit.

3. In a receiving system for electro-magnetic radiations, antenna system including branches arranged in parallel one of said branches having means to greatly vary its reactance to a received wave train with the frequency of such wave train, a bridging circuit for said branches, and a receiver circuit associated with said bridging circuit.

4. In a receiving system for electro-magnetic radiations, an antenna system, a circuit arrangement associated with the antenna system and including circuit elements in series parallel relation, a bridge connecting like terminals of said circuit, a receiving circuit connections in series parallel relation, a bridge connecting like terminals of said series parallel connections, a receiving circuit associated with the bridge, and means associated with the circuit arrangement for balancing out oscillations produced by received radiations of a given frequency.

5. In a receiving system for electro-magnetic radiations, an antenna system including branches arranged in parallel, a bridging circuit intermediate said branches, secondary branches arranged in parallel in said bridging circuit, a secondary bridging circuit intermediate said secondary branches, and a receiving circuit associated with said secondary bridging circuit.

6. In a receiving system for electro-magnetic radiations, an antenna system including interrelated branch circuits arranged in parallel relation with respect to each other and having respectively branching circuits, a receiver circuit associated with one of said bridging circuits, means for balancing out oscillations relating from radiations having a frequency lower than that of the radiations to be received, and means for balancing out oscillations relating from radiations having a frequency higher than that of the radiations to be received.

7. In a receiving system for electro-magnetic radiations, an antenna system, a preliminary bridge circuit arrangement associated therewith, a secondary bridge circuit arrangement associated with the bridging circuit of the preliminary bridge arrangement, and a receiver circuit associated with the bridging circuit of the secondary bridge arrangement.

8. In a receiving system for electro-magnetic radiations, an antenna system, a preliminary bridge circuit arrangement associated with the antenna system, a secondary bridge circuit arrangement associated with the bridging circuit of the preliminary bridge arrangement, a receiver circuit associated with the bridging circuit of the secondary bridge arrangement, means for adjusting the preliminary bridge arrangement to balance out oscillations resulting from received radiations having a frequency less than that of the radiations to be received and means for adjusting the secondary bridge arrangement to balance out oscillations resulting from radiations having a frequency greater than that of the radiations to be received.

9. In a receiving system for electro-magnetic radiations, an antenna system, interrelated bridge circuit arrangements associated with the antenna system, a receiver circuit associated with the bridging circuit of one of said interrelated bridge arrangements, variable inductance and capacity elements arranged in the legs of the interrelated bridge arrangements, one of these elements in each of the bridge arrangements combining the qualities of inductance and capacity.

10. In a receiving system for electro-magnetic radiations, an antenna system including branches in parallel one of said branches having inductance and capacity arranged in shunt to each other, a bridging circuit between said branches and a receiver circuit associated with said bridging circuit.

11. In a receiving system for electro-magnetic radiations, an antenna system including branches containing inductance and capacity in shunt to each other, a bridging circuit intermediate said branches and containing secondary branches in parallel, a secondary bridging circuit intermediate said secondary branches, and a receiver circuit associated with said secondary bridging circuit.

12. In a receiving system for electro-magnetic radiations, an antenna system including a bridge circuit arrangement, capacity and inductance associated in shunt to each other in said bridge arrangement, a secondary bridge arrangement included in the bridging circuit of the first named bridge arrangement, capacity and inductance in shunt to each other in the secondary bridge arrangement, and a receiver circuit associated with the bridging circuit of the secondary bridge arrangement.

In testimony whereof I have hereunto set my hand in the presence of the subscribing witnesses, on this 18th day of April A. D., 1910.

LEE DE FOREST.

Witnesses:
MAE W. CLINTON,
S. E. DARBY.